United States Patent
Stepanov et al.

(10) Patent No.: US 10,703,687 B1
(45) Date of Patent: Jul. 7, 2020

(54) AMORPHOUS ENERGETICS

(71) Applicant: U.S. Government as Represented by the Secretary of the Army, Picatinny Arsenal, Dover, NJ (US)

(72) Inventors: Victor Stepanov, Highland Park, NJ (US); Rajen Patel, Parsippany, NJ (US); Chris Pizzo, Ridgewood, NJ (US); Alexander Paraskos, Sparta, NJ (US); Ruslan Mudryy, Union, NJ (US); Hongwei Qiu, Harrison, NJ (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 253 days.

(21) Appl. No.: 15/817,746

(22) Filed: Nov. 20, 2017

Related U.S. Application Data

(63) Continuation-in-part of application No. 14/620,621, filed on Feb. 12, 2015, now Pat. No. 9,850,180.

(51) Int. Cl.
| | | |
|---|---|---|
| *C06B 25/34* | (2006.01) | |
| *C06B 21/00* | (2006.01) | |
| *C08G 73/18* | (2006.01) | |
| *C08L 1/12* | (2006.01) | |
| *C08L 1/14* | (2006.01) | |
| *C08L 31/04* | (2006.01) | |
| *C06B 23/00* | (2006.01) | |

(52) U.S. Cl.
CPC .......... *C06B 25/34* (2013.01); *C06B 21/0016* (2013.01); *C06B 21/0025* (2013.01); *C06B 21/0091* (2013.01); *C06B 23/006* (2013.01); *C08G 73/18* (2013.01); *C08L 1/12* (2013.01); *C08L 1/14* (2013.01); *C08L 31/04* (2013.01)

(58) Field of Classification Search
CPC ..................................................... C06B 25/34
See application file for complete search history.

(56) References Cited

U.S. PATENT DOCUMENTS

| | | | | |
|---|---|---|---|---|
| 2,067,213 A | * | 1/1937 | Snelling | C06B 45/10 149/18 |
| 4,822,843 A | * | 4/1989 | Edelman | C08G 73/106 524/439 |
| 5,710,205 A | * | 1/1998 | Davies | C08L 27/18 524/502 |
| 6,833,037 B1 | * | 12/2004 | Hallam | C06B 45/10 149/19.9 |
| 2002/0121321 A1 | * | 9/2002 | Takayama | C06B 31/28 149/46 |

OTHER PUBLICATIONS

Cooper, Paul W. and Kurowski, Stanley R., Introduction to the Technology of Explosives, 1996, p. viii-ix, Wiley-VCH, USA.
Meyer, R. et al., "Explosives", 6th Ed, Wiley-VCH, 2007, USA.
https://www.britannica.com/science/polyvinyl-acetate (last access Aug. 14, 2019).
Newman, Anne, Pharmaceutical Amorphous Solid Dispersions, Wiley, 2015, USA.
Aabid A. Mir et al., "Synthesis and Properties of Polymers Containing 2H-Benzimidazol-2-one Moieties: Polymerization via N—C Coupling Reactions," ACS Macro Lett., 2012, 1, 194-197.

* cited by examiner

*Primary Examiner* — Aileen B Felton
(74) *Attorney, Agent, or Firm* — Lisa H Wang

(57) ABSTRACT

Stabilized, amorphous high energetic compositions having crystallization inhibiting polymers dispersed throughout the solid composition. The compositions disclosed herein are an improvement over crystalline high energetic compositions in that such disclosed compositions are stable and possess physical properties desirable in propellant and high explosive applications.

11 Claims, No Drawings

AMORPHOUS ENERGETICS

RELATED APPLICATIONS

This application is a continuation-in-part application of pending U.S. application Ser. No. 14/620,621 filed Feb. 12, 2015, the contents of which are incorporated herein by reference.

GOVERNMENTAL INTEREST

The invention described herein may be manufactured and used by, or for the Government of the United States for governmental purposes without the payment of any royalties thereon.

FIELD OF THE INVENTION

The present invention relates in general to solid compositions of stable amorphous forms of secondary explosives and to a method of preparation of such materials using spray drying-technology with the addition of polymeric additives and mechanical treatment.

BACKGROUND OF THE INVENTION

Secondary high explosives, including the nitramines RDX, HMX, and CL-20, are typically used in their common crystalline states. In order to alter their explosive properties including energetic performance and sensitivity to inadvertent initiation, parameters including the crystal size, crystal polymorph, and crystal quality are often varied.

A known alternative to the solid crystalline form of organic materials is an amorphous (aka glassy) state. A key distinction between these two forms/states, is that in the glassy state the constituent molecules are arranged in a highly disordered manner, while in crystalline materials the molecules have long range ordering. Due to the disorder in the molecular arrangement, amorphous materials inherently contain additional specific energy versus crystalline forms—as a result of the strained arrangement of the molecules. In such a "strained" form, materials typically exhibit drastically differing physical properties when compared to the crystalline form. These different physical properties are often characterized by: significantly lower thermal conductivity; optical transparency; and liquid-like viscous flow above the glass transition temperature (Tg). Further, due to the stored strain energy in the amorphous material, reaction of such materials can potentially be faster and more exothermic than in the crystalline form. So, while it would appear that amorphous materials have some potential advantages over crystalline materials for use as explosives—due to the higher Gibbs free energy inherent to the amorphous state relative to the crystalline state, there is a general tendency of amorphous materials to crystallize. This is a major obstacle encountered in numerous fields including pharmaceuticals and often hinders transitioning of amorphous materials to end items.

Therefore, there is a need in the art for secondary explosive materials that are in an amorphous state that is stable—such that the subject explosive materials will exhibit desirable properties not available in such materials that are in their crystalline forms.

SUMMARY OF THE INVENTION

Disclosed herein is a method to obtain stable, novel, amorphous explosive materials which are prepared from conventional, crystalline, secondary high explosives, such as HMX and CL-20. In the subject novel amorphous form, the material properties drastically differ from the crystalline precursor materials. These properties include enhanced reactivity, reduced sensitivity to inadvertent initiation, ability to glass cast, and optical transparency. Surprisingly, the properties of the new amorphous high explosive materials enable the creation of explosive compositions which can be exceptionally insensitive, fully dense (>99% of theoretical maximum density (TMD)), and made readily detonable when desired upon heating; whereby the explosive material converts back to the crystalline form. Methodology is disclosed to obtain a highly amorphous product. Furthermore, methodology for stabilization of the amorphous material is provided. This is essential for successful implementation of amorphous explosive compositions as amorphous materials are known to have a high tendency to convert to the more thermodynamically favorable crystalline form.

To overcome the known tendency of amorphous explosive materials to convert to the more thermodynamically favorable crystalline forms—the amorphous powdered explosive materials of the subject invention are manufactured by a method which involves the rapid evaporative precipitation of the powder constituents from a solvent using conventional spray drying technology. A polymeric additive (i.e. polymer) is required to inhibit crystallization of the, secondary high explosive, or blends thereof, during the spray drying and to improve long term stability of the amorphous phase. Choice of a particular polymeric additive depends on the desired performance and stability of the end product.

Further, to enhance the stability of the amorphous material after the spray drying process, the subject inventive method involves compacting the amorphous spray dried material into a pellet, or other form. Such compaction greatly enhances the stability of the resulting amorphous material.

Further disclosed herein are solid energetic compositions comprising stabilized, amorphous secondary high explosives having polymers dispersed in the amorphous secondary high explosives, wherein the polymers inhibits the re-crystallization of the high explosives.

In one aspect of the invention disclosed herein, the crystallization inhibiting polymers are selected from the group consisting of polyvinyl acetates, cellulose acetate butyrates, cellulose acetates, polyimides, and nitrocellulose.

In another aspect of the invention disclosed herein, the crystalline inhibiting polymer is poly(benzimidazolone sulfone) (PBIS).

Additional features and advantages of the present invention will be set forth in, or are apparent from, the drawings and detailed description of preferred embodiments thereof which follows.

DETAILED DESCRIPTION OF PREFERRED EMBODIMENTS

New Materials, Properties, Applications

The amorphous secondary high explosive materials prepared by the present inventive method are readily used in current military munitions as replacements for the munitions main charges, boosters, and detonator output charges. As stated above, the subject amorphous explosive materials offer significant improvements in safety (sensitivity to inadvertent initiation) as well as explosive performance versus the commonly used crystalline explosives from which these materials are derived.

As also stated above, the amorphous materials which are the subject of this invention are prepared from at least one commonly used crystalline secondary high explosive materials, such as HMX, RDX, or CL-20. More specifically, the commonly used crystalline secondary high explosive material from which the inventive amorphous material are manufactured—can be a pure secondary high explosive material (such as HMX, RDX, or CL-20), or blends of two or more such crystalline secondary high explosive materials.

The pure or blended crystalline secondary high explosive material must itself be blended with a polymeric additive to—as stated above, inhibit crystallization of, secondary high explosive, or blends thereof, during the spray drying and to improve long term stability of the resulting amorphous phase. The chemical structure, molecular weight, density or other relevant characteristic of the polymeric additive is important to obtain the desired stability and reactivity of the end product.

In selecting stabilizing polymers, it is desirable to select polymers having high glass transition temperatures ($T_g$) (of at least about 100° C. to about 400° C.) that also have common solvents with the desired secondary high explosives to be used in the final amorphous composition. It has been determined that such polymers provide the amorphous explosive the ability to survive intensive thermal aging conditions. When such amorphous explosive compositions are stored below their glass transition temperature, crystallization can be avoided. By selecting a polymer having a relatively high $T_g$, the amorphous composition itself will have a very high $T_g$, thereby enhancing the stability of the amorphous phase with respect to crystallization An exemplary high Tg polymer may include poly(benzimidazolone sulfone) (PBIS) which are random copolymers of poly(benzimidazole sulfone) with biphenolsulfone. The PBIS compounds are formed by the condensation of three distinct monomeric units. Aabid A. Mir et al, "Synthesis and Properties of Polymers Containing 2H-Benzimidazol-2-one Moieties: Polymerization via N—C Coupling Reactions", ACS Macro Lett. 2012, 1, 194-197 details the $T_g$ relationship to the ratio of the copolymer constituents, such Tg polymers are incorporated herein by reference in its entirety.

Additional exemplary polymers include, polyvinyl acetate, cellulose acetate butyrate, cellulose acetate, polyimide, and nitrocellulose.

Additional additives such as burn rate modifiers, stabilizers, plasticizers may be added to the stabilized high energetic compositions.

Further, as also stated above, due to the disordered arrangement of molecules in an amorphous state of the present inventive amorphous secondary high explosive materials—excess stored energy from configurational strain is present. This excess stored energy renders the material more reactive in relation to crystalline analogs. The enhanced reactivity and higher specific free energy of the amorphous material both are manifested in improved detonation and initiation behavior. This includes smaller critical detonation failure dimensions, improved corner turning, shorter shock to detonation transition (SDT) and shorter deflagration to detonation transition (DDT). These properties are especially important in explosive components with small charge dimensions. Another benefit of amorphous energetics of the present invention is enhanced burn rate which can be exploited in propellant applications ranging from rocket motors to microthrusters.

While the amorphous explosives of the present invention are more reactive and more energetic than the crystalline secondary explosive or explosives from which they are formed—importantly their initiation sensitivity can be surprisingly very low. The shock sensitivity, for example, can be effectively eliminated all together when the material is loaded at full density, with effectively no porosity. In such an instance, a highly homogeneous explosive charge is achieved, devoid of heterogeneities such as cracks, voids, and even grain boundaries and dislocations which are all characteristically present in crystalline charges and to which initiation sensitivity is attributed.

An important embodiment of the present invention is the capability of the highly insensitive amorphous phase to become sensitized on demand by heating, such that the material undergoes crystallization resulting in a heterogeneous, porous structure which can be readily initiated by existing initiation technology. Selective heating or application of light to portions of the amorphous composition can revert those treated sections back to a crystalline state.

Also, improved loading of amorphous explosive is another advantage over traditional, crystalline forms thereof. This is a direct result of the glass transition phenomenon common to amorphous materials in general. Above the glass transition temperature (Tg), softening occurs such that the material exhibits liquid-like viscous flow—in which state, molding of amorphous explosives into casings can be accomplished at much lower pressures than when molding the conventional crystalline analogs. Further, and surprisingly, densities as high as ca. 100% of TMD are readily achievable.

Inventive Method

The inventive method for creating the amorphous energetic/secondary explosive materials of the present invention is based on the rapid precipitation of a crystalline secondary explosive material from solution. At very high precipitation rates, the conditions become favorable for the formation of the desired amorphous phase of the subject secondary explosive materials. The capacity to form an amorphous phase depends on the molecular structure including size and conformational flexibility of the particular crystalline explosive material being converted. In general, smaller molecules tend to be less likely to form an amorphous phase than larger molecules. Another factor is the melting point. Materials with lower melting points can be rendered amorphous by rapid melt quenching. Common secondary high explosive materials tend to have relatively small molecular sizes and therefore are more challenging to convert to the desired amorphous state. To overcome this difficulty, blending of explosives and/or addition of polymeric additives is employed. This is achieved by spray drying a solution containing the desired materials including the secondary high explosive and the polymeric additive, to rapidly precipitate the desired amorphous form.

Rapid precipitation from solution is achieved using conventional spray drying technology. During the spray drying, the feed solution is atomized into fine droplets within a flowing drying gas (usually hot nitrogen or air). Due to the high surface area of the liquid droplets, rapid evaporation can be attained. This consequently leads to rapid precipitation of the solutes within the droplets. It has been shown that the highest precipitation rate occurs at the outer surface. As precipitation progresses, a shell-like structure forms, containing the remainder of the solution within. As the shell thickens, droplet evaporation slows due to impeded mass transfer caused by the shell. As the evaporation rate decreases so does the precipitation rate. Since at slower precipitation rates, formation of crystals becomes increasingly likely, it is important to set the spray drying conditions such as the solution droplet size and heating gas temperature so that no crystalline product is formed.

Selection of the atomizer setting and thereby the droplet size of the atomized solution, will determine the final size of the amorphous particles. This is an important consideration when control over microstructure is necessary, for example the void size distribution in a pressed charge made from the amorphous powder. Particle size will also influence the specific surface area which has a strong effect on the propagation of combustion and detonation of the final amorphous secondary explosive being created.

Further, a critical result of this inventive process is the stabilization of the amorphous explosive—as, as stated above, the subject amorphous materials typically tend to readily convert to the more thermodynamically favorable crystalline state. The desired stabilization is achieved by the addition of polymers. The degree of stability is tied to the amount of the additive, as well as its chemical structure and molecular weight. Modification of these variables enables tuning the product stability to desired levels. Stabilization of the amorphous material is also enhanced by compaction of amorphous powder to form pellets or any other compressed configuration. Maximum stability is achieved with such pellets or other form at densities near the TMD value of the given material.

The drying gas temperature and flow rate during spray drying should be selected such that the solution droplets are completely dried within the drying chamber. The temperature should not exceed temperatures at which decomposition of the product may take place. Typically, a temperature at or above the boiling point temperature of the solvent is used.

The dry powder can be effectively separated from the drying gas stream using a cyclone separator, however, alternatively a bag filtration may be employed.

Example 1. Preparation of Amorphous CL-20/HMX/PVAc Compositions

Amorphous embodiments of the present invention were prepared using a combination of crystalline secondary explosive materials CL-20 and HMX. Initially the respective secondary crystalline explosive materials were placed into solution with the solvent acetone. The solutions were prepared at room temperature with the following alternative crystalline secondary high explosives and polymer ratios: CL-20/HMX/polymer ratios: 50/45/5 and 60/35/5 wt %, with the solvent to HMX weight ratio fixed at 50/1. The preferred polymer added to the mixture/solution was polyvinyl acetate (PVAc) with a 100,000 M.W. The solutions, with the added PVAc, were spray dried using a Buchi model B-290 laboratory spray dryer equipped with a two-fluid gas nozzle (0.7 mm diameter). $N_2$ was used for atomization as well as the drying gas. The drying gas inlet temperature was set to 90° C. The drying gas flow rate was set to ~35 $m^3$/hour. The liquid feed rate was set to 5 ml/min. The product was collected from the gas stream using a cyclone separator.

The products from Example 1 were analyzed using Powder X-ray Diffraction (P-XRD), and the X-ray diffraction patterns showed a broad diffraction halo without sharp peaks. Therefore, it can be concluded that the materials are highly amorphous. Further, SEM images were taken of the CL-20/HMX/PVAc (60/35/5) product—after the spray drying. The image shows spherical particles with a very small mean size and having smooth surfaces—consistent with amorphous structure.

Stability Analysis

As detailed above, a critical element of the stabilization of the inventive amorphous powder is use of a stabilizing polymeric additive. For example, when the amorphous composition of the present invention was prepared with polyvinyl acetate (100,000 M.W.), CL-20/HMX/PVAc (60/35/5), the as prepared powder when kept in an oven at 100° C. for 16 hours completely converted to a crystalline material as was confirmed by P-XRD analysis. The use of NC as the polymeric additive appears to greatly stabilize the amorphous phase. For example, the amorphous composition prepared with CL-20/NC (70/30) when heated at 100° C. for 16 hours did not show signs of crystallization when inspected by P-XRD.

A second mode of stabilization of the amorphous phase, as disclosed above, is via compaction. The CL-20/HMX/PVAC (60/35/5) composition when pressed into a cylindrical pellet or other configuration, at a density of 1.65 g/cc exhibited greatly improved thermal stability in comparison to the lose powder of the same material. No conversion of the amorphous material to crystalline was observed following exposure to 100° C. for 16 h.

Example 2. Preparation of Amorphous CL-20 with Nitrocellulose

A solution was prepared containing the secondary explosive material CL-20 and the polymeric additive nitrocellulose (NC) (70/30 wt %), with acetone as the solvent. The ratio of CL-20 to acetone was 1/10. The spray drying conditions were the same as described in Example 1. After spray drying to remove the acetone and rapidly precipitate the explosive materials—PXRD analysis on the produced material was done and it was concluded, from the lack of sharp Bragg peaks, that the produced material has an amorphous structure.

Example 3. Preparation of Amorphous HMX/CL-20 with PBIS

A mixture consisting of 15% Poly(benzimidazolone sulfone)s and 4,4'-Biphenol Copolymer with 21.25% HMX, and 63.75% CL:20 (% mass) was dissolved in 80° C. DMF and spray dried. This yielded a composition having a $T_g$ above 85° C. and This amorphous powder was pressed into a pellet and stored at 70° C. over an extended period of time and was found to not crystallize.

Example 4. Preparation of Amorphous CL-20/HMX with Cellulose Acetate

An amorphous propellant consisting of 60 wt % CL-20, 20 wt % HMX, and 20 wt % cellulose acetate (CA) 30,000 MW, was prepared by spray drying an acetone solution containing 6 wt % CL-20, 2 wt % HMX, and 2 wt % CA. The solution was spray dried with a Buchi, model B-290 laboratory spray dryer. The solution was atomized using a two-fluid pneumatic nozzle (Model 044698, Buchi) with nitrogen as the atomizing gas. The inlet drying gas temperature was set to 95° C., with a flow rate of 35 m $m^3$/hr. The solution feed rate was set to 5 ml/min. The product was separated from the gas stream with a cyclone separator. The collected material was analyzed by powder X-ray diffraction. The powder pattern showed a broad halo-like pattern with no sharp peaks, suggesting the material is completely amorphous.

While the present invention was described using certain exemplary, specific embodiments, those skilled in the art will recognize that the teachings presented herein are not limited to these specific embodiments. The preferred embodiments of the invention are provided for the purpose of explaining the principles of the present invention and its practical applications, thereby enabling others skilled in the art to understand the invention. Various embodiments and modifications are contemplated within the scope of the present invention.

What is claimed is:

1. An energetic solid solution comprising:
   secondary high explosive wherein the amorphous secondary high explosive is cyclotetramethylene-tetranitramine (HMX), hexanitrohexaazaisowurtzitane (CL-20), and trimethylenetrinitramine (RDX) or a combination of at least two thereof, and at least one polymer selected from the group consisting essentially of poly(benzimidazolone sulfone), polyvinyl acetate, cellulose acetate butyrate, cellulose acetate, polyimide, and nitrocellulose and, wherein the secondary high explosive and polymer are present as a single-phase glassy state.

2. The energetic solid solution of claim 1, wherein the polymer is polyvinyl acetate.

3. The energetic solid solution of claim 1, wherein the polymer is cellulose acetate butyrate.

4. The energetic solid solution of claim 1, wherein the polymer is cellulose acetate.

5. The energetic solid solution of claim 1, wherein the polymer is polyimide.

6. The energetic solid solution of claim 1, wherein the polymer is nitrocellulose.

7. The energetic solid solution of claim 1, wherein the polymer is poly(benzimidazolone sulfone) (PBIS).

8. The energetic solid solution of claim 1, wherein the polymer has a $T_g$ of about 100° C. to about 400° C.

9. The energetic solid solution of claim 1, wherein the amorphous, secondary high explosive is 60-99% by weight and the polymer is 1-40% by weight percent.

10. The energetic solid solution of claim 1, further comprising blast enhancing additives selected from the group consisting of aluminum, graphite and carbon nanotubes.

11. The energetic solid solution of claim 1, wherein the solid solution is compacted into a dense form.

* * * * *